June 9, 1953 — J. J. GANO — 2,641,041
CUTTING MACHINE FOR PLASTIC MATERIAL
Filed Jan. 2, 1948 — 7 Sheets-Sheet 1

INVENTOR.
Joseph J. Gano

INVENTOR.
Joseph J. Gano

INVENTOR.
Joseph J. Gano

INVENTOR.
Joseph J. Gano

June 9, 1953  J. J. GANO  2,641,041
CUTTING MACHINE FOR PLASTIC MATERIAL
Filed Jan. 2, 1948  7 Sheets-Sheet 6

*INVENTOR.*

Joseph J. Gano

June 9, 1953  J. J. GANO  2,641,041
CUTTING MACHINE FOR PLASTIC MATERIAL
Filed Jan. 2, 1948  7 Sheets-Sheet 7

INVENTOR.
Joseph J. Gano

Patented June 9, 1953

2,641,041

UNITED STATES PATENT OFFICE 2,641,041

CUTTING MACHINE FOR PLASTIC MATERIAL

Joseph J. Gano, Worcester, Mass., assignor, by mesne assignments, to Julianna Orbell, Brooklyn, N. Y.

Application January 2, 1948, Serial No. 275

3 Claims. (Cl. 25—107)

This invention relates to machines for cuttting plastic substances, particularly clay products that are produced by extrusion in the form of a continuous column such as building tile, for instance.

In the manufacture of brick and hollow tile by the "stiff mud" process, the clay is tempered with water and the mixture is pugged into a homogeneous mass which is pushed through a die as a continuous column. While the clay is still in plastic form upon issuing from the die, the column is cut into lengths. The machines for cutting the column employ wires which are pushed through the clay transversely of the column. The use of wires only for cutting require that end surfaces of the units be in one plane for each unit.

The present invention has, as its principal object, apparatus that will cut irregular contours for the end surfaces of brick or tile units. Another object is the provision of apparatus for simultaneously cutting off and recessing the end surfaces of blocks. Still another object provides for cutting a tongue and groove onto the end surfaces of blocks. A further object is to provide for the cutting of holes intermediate the end surfaces of the blocks.

Another object is to provide a block with end recesses that will form a lock for mortar in a wall construction. Still another object is to provide a block that will interlock with the next adjacent blocks in a wall construction resulting in a stronger wall. A further object is to provide a block that will render a wall impervious to moisture penetration. A still further object is to provide a block that will facilitate the installation of plumbing and electrical fixtures in a wall.

Another object is the provision of an automatic and high speed machine for cutting units from a continuous clay column. Another object is to provide a cutting machine with a novel yet simple device for reciprocating the machine longitudinally with respect to the column. A further object is to provide a novel oscillating clutch mechanism. A still further object is to provide a mechanism for producing rotating intermittent motion.

These and other objects will be more fully understood by reference to the accompanying drawings and description.

Figure 1:
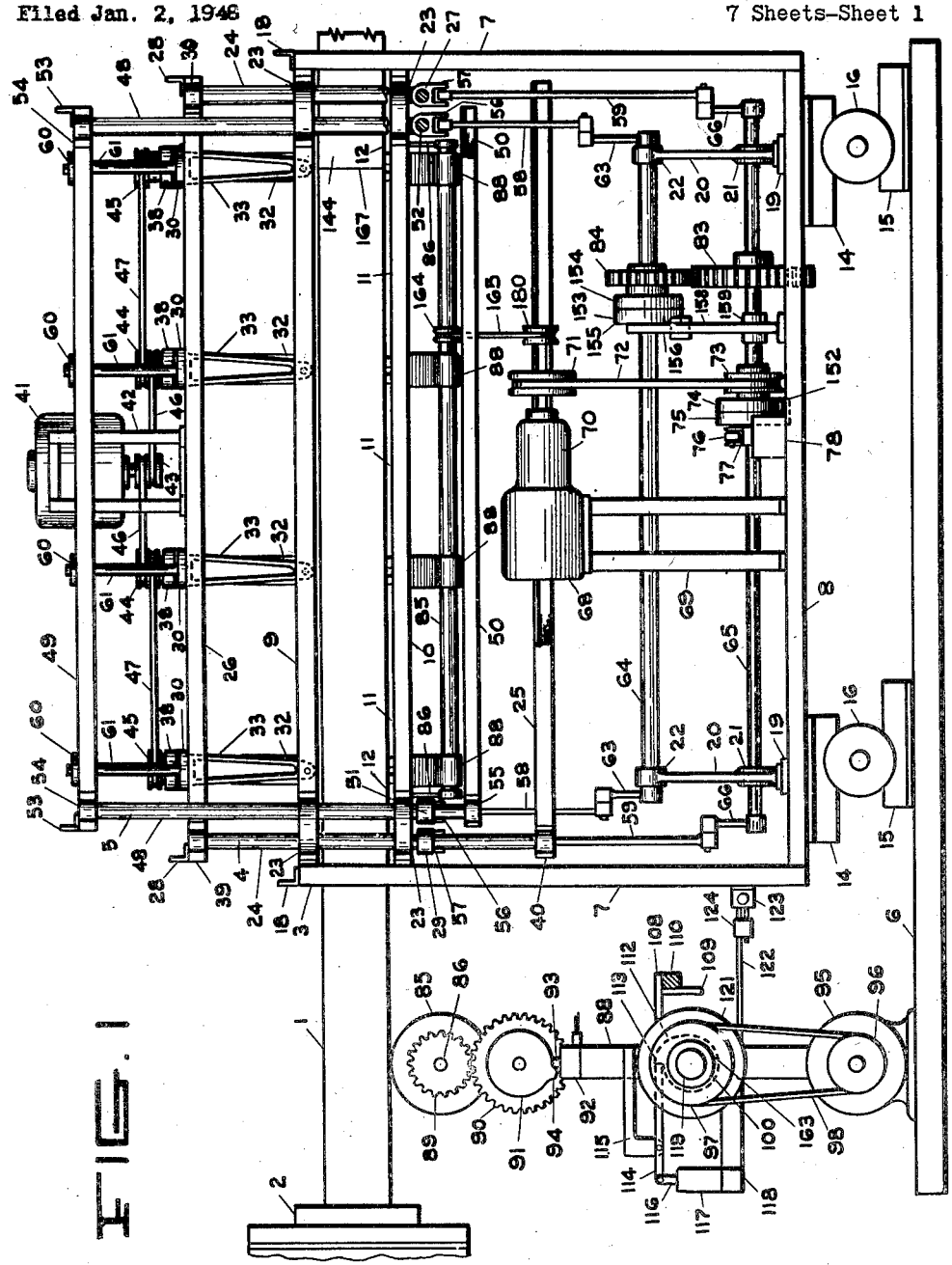
Figure 1 is a side elevation of the cutting machine with the support for the timing and carriage return mechanisms omitted in order to show other parts in detail.
Figures 2, 3:
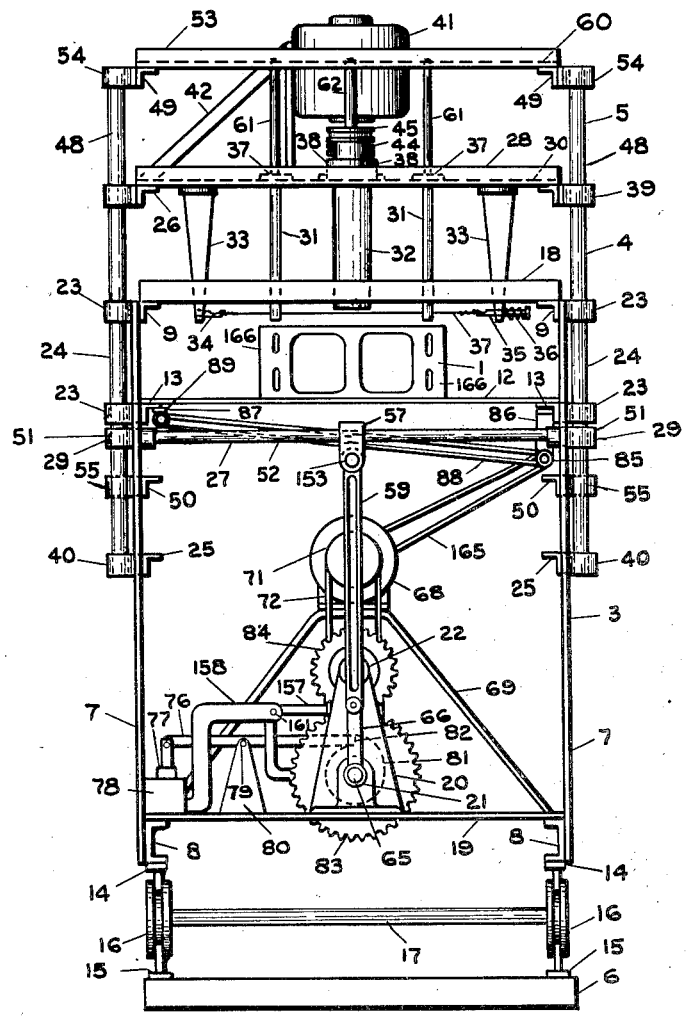
Figure 2 is an elevation of the cutting machine from the leaving end.
Figure 3 is an elevation of the mechanism for securing intermittent motion of the cutter and ejector frames.

Referring to Figures 1 and 2 and accompanying drawings, the present embodiment of the invention consists of main carriage 3 which can reciprocate in a longitudinal direction with respect to column of clay 1. Carriage 3, fabricated from metal bars, is a rectangular framework. Horizontally spaced channels 8, tied by bridge bars 19 form the base. Vertical bars 7 are attached to channels 8. The top of the framework consists of angle bars 9 and 18 which are attached together to form a rectangle and the unit is attached to bars 7. Angle bars 13 are secured to corner posts 7. Platens 11 and 12 are attached to angle bars 13. The clay column passes over platens 11 and 12 and clears the top of the carriage framework. At each end of horizontal angle bars 9 and 13 are mounted blocks 23, each having two bearings that permit hollow shafts 24 and 48 to slide vertically within them.

Hollow shafts 24 comprise the corner posts of rectangular cutter frame 4 which carries the apparatus for cutting the clay column into lengths. The top of the cutter frame consists of angle bars 26 and 28 which are secured together forming a horizontal rectangular frame. The corner posts 24 are connected at the bottom by means of horizontal angle bars 25 and brackets 40. Brackets 39 attach the top framework of bars 26 and 28 to corner posts 24. By means of brackets 29 and horizontal round bars 27, the vertical sections of the cutter frame are transversely tied at the bottom. The rigid framework can reciprocate vertically within carriage 3 by means of shafts 24 sliding in bearings 23.

The top of the cutter framework carries the apparatus for cutting the clay column. As shown in Figure 1, the machine can cut three units simultaneously, but the machine may be designed to cut any number of units. In Figure 2, horizontal bridge bars 30 are mounted transversely on angle bars 26. Extending downward from bridges 30, near each end, are wire brackets 33. At the bottom of one set of the wire brackets are secured wire hooks 34 onto which the cutting wires 37 are looped. The other set of wire brackets carry wire hooks 35 which can slide in bearings of the brackets, permitting springs 36 to maintain a tension on the cutting wires.

Figure 5:
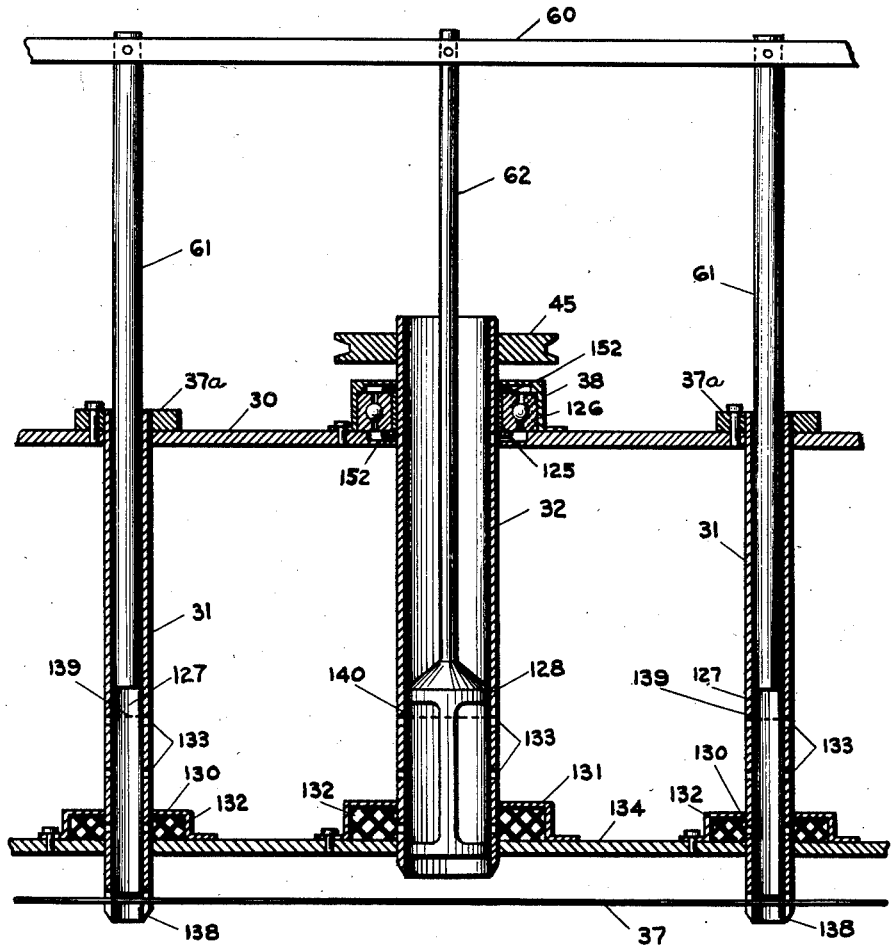
Figure 5 is a sectional view showing the apparatus for cutting a block with end recesses.
Figure 5:
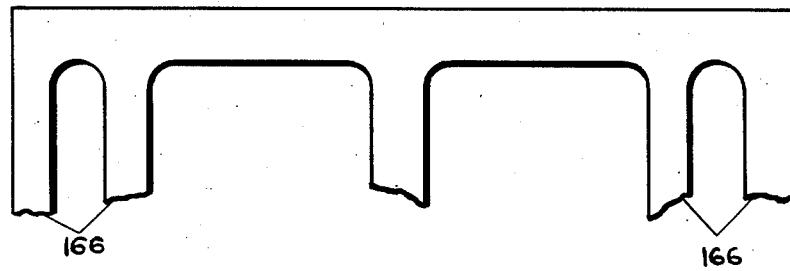

Figure 5 shows the details of the mounting of the apparatus for cutting vertical holes into the clay column. Two small diameter, thin walled cylindrical tubes 31 are vertically mounted on each bridge 30 so that they will cut into the clay column a short distance from the sides. Column 1, as shown, can be cut into hollow tile blocks. Tubes 31 are approximately centered in the double side walls 166 of the column. In order to mount them on bridges 30, each of tubes 31 has a collar 37a, pressed on or attached by other suitable means. The collars are secured to the bridges.

Aligned with the center of the column is a set of large diameter thin-walled cylindrical tubes 32. Near the top of the tubes are mounted radial ball bearings 126. Collars 125 are pressed on or secured to the tubes by some other suitable means. Enclosures 152 lock the inner races of the ball bearings. The bearings are enclosed in housings 38 in which the outer races are secured. The housings are mounted on bridges 30. This ball bearing assembly enables the tube to rotate.

Referring to Figure 1 again, as means for driving tubes 32, electrical motor 41 is mounted vertically on bracket 42 which in turn is secured to the top of cutter framework 4. The shaft of the motor holds double pulley 43. Through belts 46 and double pulleys 44, the two nearest tubes are driven. Pulleys 44 in turn drive the two end tubes through belts 47 and pulleys 45. Thus the rotation of motor 41 will cause the rotation of all the center tubes.

To guide both small tubes 31 and large tubes 32, guide plates 134 are transversely mounted on angle bars 9 of carriage 3. As shown in Figure 5, the guide plates contain bearing holes to permit the tubes to slide through them. Attached to the guide plates are housings 131 for the large tubes and housings 132 for the small tubes. Within these housings is oil impregnated fabric 132. As the tubes slide vertically, a film of oil is deposited on the outside surface of the tubes. The inside surface is lubricated through holes 133 in the walls of the tubes. As the holes pass the oil impregnated fabric, oil is pushed through the holes to the inside surface. The oil film on the surface of the tubes reduces the frictional resistance as the tubes cut the clay column.

Figure 11:
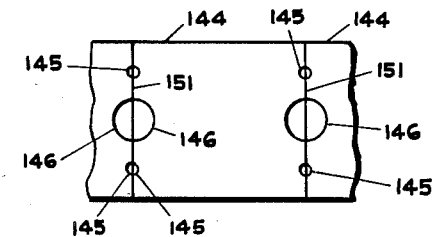
Figure 11 is a plan view of a portion of the column after it has been cut with the cutting apparatus of Figure 5.

Since tubes 31 do not revolve, slots 138 are cut into the bottom of the walls to guide wires 37, as shown in Figure 5. Since tubes 32 do revolve, clearances are provided between the lower ends and wires 37. A plan view of the cuts produced on the column by these assemblies of cutter tubes and wires is shown in Figure 11. Wires 37 produce transverse straight cuts 151, and the tubes produce circular cuts 145 and 146.

Figure 10:
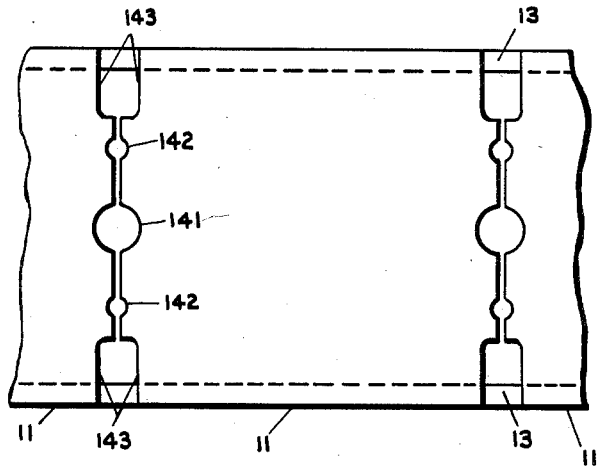
Figure 10 is a plan view of a portion of the platen of the cutting mechanism.

Figure 10 shows a plan view of platen plates 11. The plates are separated in order that wires 37 may pass through. Recesses 141 and 142 allow the cutting tubes to pass through. Cut-outs 143 permit the ends of brackets 33 and the wire hooks 34 and 35 to pass below the plane of the platens.

Referring to Figure 5, ejectors 61 and 62 are introduced for the purpose of pushing the cores cut by the tubes out of the column. These ejectors are mounted within frame 5 which has the same rectangular shape as cutter frame 4. As shown in Figures 1 and 2, angle bars 49 and 53 are secured to form the top of the structure. Brackets 54, which are mounted on angle bars 49, secure vertical hollow shafts 48. The bottom of shafts 48 are attached to brackets 55 which are connected by horizontal bars 50. The framework is connected transversely near the bottom by means of brackets 51 and round bars 52 in the same manner that brackets 29 and round bars 27 connect cutter framework 4.

Rectangular bars 60 are attached to angle bars 49, bridging the top of the ejector framework. Connected to bars 60 and projecting downward are ejector shafts 61 and 62. At the bottom of the shafts are attached ejector pistons 127 and 128, Figure 5. Each piston has a slide fit in its corresponding hollow cutting tube. For the small cutter tubes the pistons and shafts may be integral as shown by shafts 61 and pistons 127. For the larger cutters, pistons 128 may be cored to reduce weight. Since the ejectors will be traveling down while the tubular cutters and wires 37 are traveling up, interference between the wires and pistons must be overcome. For this purpose, diametrical slots 139 and 140, slightly wider than the diameter of the wires, are cut vertically into the bottom of the pistons. These slots are aligned with the wires and extend deep enough into the pistons to avoid interference between the bottom of the slots and the wires during operation. For both pistons slots 139 and 140 and cutter slots 138, the entrance to the slots may be chamfered to guide the wire into the narrow slots.

Figure 6:
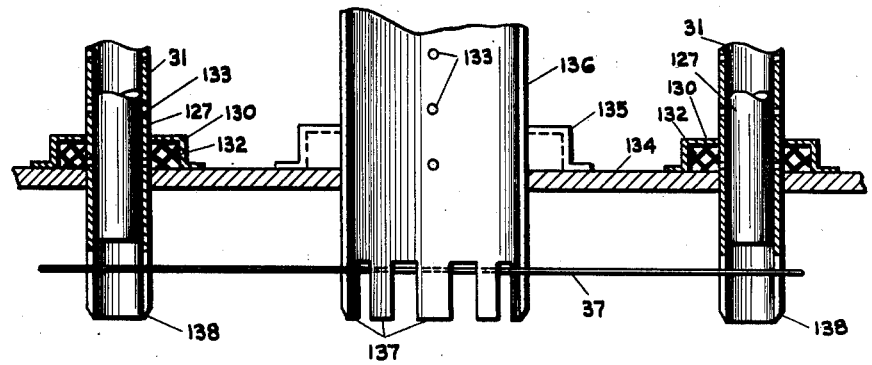
Figure 6 is a sectional view of the apparatus for cutting a tongue and groove on the end surface of a block.
Figure 7:
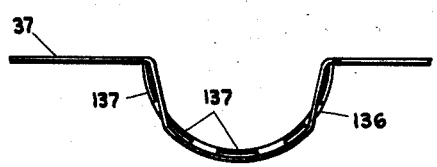
Figure 7 is a bottom view showing the method of applying a cutting wire to the semi-cylinder of Figure 6.
Figure 12:
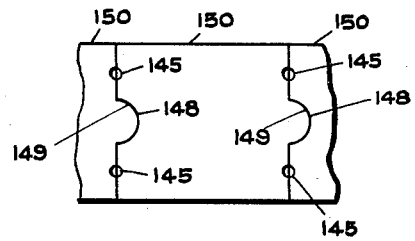
Figure 12 is a plan view of a portion of the column after it has been cut with the apparatus of Figure 6.

It may be desirable to cut a column into units which have corresponding tongues and grooves. Figure 12 shows such units where tongues 149 and grooves 148 are centrally located. Mortar recesses 145 are maintained the same as those of Figure 12. The cutter apparatus to accomplish such contour cutting is shown in Figures 6 and 7. Cylindrical cutters 31 for cutting recesses 146 along with ejecting pistons 127 and lubricators 132 are the same as those shown in Figure 5. In order to cut the tongue and groove, thin walled cutter 136 has one half of the cylindrical tubing cut away for the portion that enters the clay column. The bottom of cutter 136 contains teeth 137 through which cutting wire 37 is threaded.

The cutting wire passes through small cutters 31 in the same manner as previously.

Since there is no longer a clay slug cut by the center cutter, ejector piston 128 and shaft 62 are omitted. Since the cutter is not rotated, ball bearing assembly 38 may be omitted or clamped so as to prevent rotation. Neither are motor 41 and pulleys 44 and 45 required.

The cutting apparatus may be varied so that tongues and grooves can be cut at the sides of the column and recesses at the center or in other combinations.

Referring to Figure 1, the power to reciprocate the cutter and ejector frames is supplied by electrical motor 68 through speed reducer 70. The motor-reducer is mounted on bracket 69 which is attached to the base of carriage 3. Through pulley 71, mounted on the output shaft of the speed reducer, belt 72 and pulley 73 mounted on clutch mechanism 152, shaft 65 is rotated. The shaft rotates in journal bearings 21, mounted on bearing blocks 20.

The bearing blocks are mounted to the base of carriage 3 through rectangular bars 19. Secured to the ends of shaft 65 are cranks 66. As shown in Figure 2, connecting rods 59 connect the cranks with the cutter frame through brackets 57 and wrist pins 153. Thus, when crank shaft 65 rotates, cutter frame 3 reciprocates vertically within bearing blocks 23.

In Figure 1, clutch mechanism 152 is of the single revolution type. The driven member will rotate a single revolution and automatically disengage. While other types such as the friction or jaw design may be used, the type shown employs the wedging action of rollers between a cam and a circular race. Pulley 73 is keyed to driving member 74 which rotates constantly on the crank shaft while motor 68 is operating. A circular race is carried by driving, or outer, member 74. The inner or driven member is keyed to shaft 65. A cage encloses the clutch rollers, spacing them radially between the circular race and the roller cam part of inner member 75. As shown in Figure 2, trip cam 81, having step 82, is connected with the roller cage and serves to move the rollers in and out of driving contact between the roller cam and the race. To control the clutch, trip lever 76 is pivotally mounted on bracket 80 which is secured to the base of carriage 3. One end of the trip lever contacts cam step 82. The other end of the lever is connected to armature 77 of electrical solenoid 78. When the trip lever engages the cam step, the clutch is released, the shaft 65 remaining stationary, and driving member 74 continuing to rotate. When the trip lever is moved out of contact with the cam step by the energization of the solenoid, the clutch immediately engages, causing shaft 65 to rotate. During the engagement period, both members of the clutch rotate. Trip cam 81 revolves with the inner member, counter-clockwise, as shown in Figure 2. A spring, not shown, keeps the end of trip lever 76, in contact with the outer surface of the trip cam, so that upon completion of a revolution, cam step 82 is engaged, releasing the clutch. The clutch continues released until another cycle is initiated by energizing solenoid 78.

Referring to Figures 1 and 2, ejector frame 5 is driven by shaft 65 through a pair of spur gears and another single revolution clutch. Gear 83, keyed to shaft 65, drives gear 84 which is keyed to inner or driving member 154 of clutch 153. This member rotates on shaft 64 when shaft 65 is rotating and the clutch is disengaged. Outer, or driven, member 155, is keyed to shaft 64. As shown in Figure 3, which is a view of the clutch mechanism from the front end of the machine, one end of trip lever 157 engages the step of trip cam 156 when the clutch is released. Trip lever 157 is in the form of a bell crank and is pivoted at shaft 161 which is secured to bracket 158. Bracket 158 is mounted on the base of cutter frame 3. The other end of trip lever 157 carries roll 159 which rides on the periphery of cam 160. Cam 160 is keyed to shaft 65. Thus when shaft 65 rotates, shaft 64 is stationary until rise 162 of cam 160 reaches roll 159, moving trip lever 157 out of contact with the step of clutch cam 156. The clutch then remains engaged until a full revolution is completed, counter-clockwise in Figure 3, at which point the trip lever urged against the periphery of cam 156 by means of a spring, not shown, contacts the step and disengages the clutch. The number of teeth in gears 83 and 84 is so selected that the two crankshafts 64 and 65 reach their top dead centers at approximately the same time.

As shown in Figure 1, shaft 64 rotates within two journal bearings 22 which are mounted in bearing blocks 20. At the ends of shaft 64, cranks 63 are secured. Connecting rods 58 connect these cranks to the ejector frame through wrist pins and brackets 56. When crank shaft 64 rotates, ejector frame 5 reciprocates within bearing blocks 23.

For the purpose of conveying the cylindrical slugs of clay, cut by tubes 61 and 62, off to the side of the machine, belts 88 are located below the platens so as to receive them. See Figures 1 and 2. Shafts 85 and 89 are mounted in bearing blocks 86 and 87 respectively. The bearing blocks are secured to angle bars 13. Shaft 85 is rotated from motor and reducer 68—70, through pulleys 180 and 164, and belt 165. The rotation of shaft 85 causes conveyor belts 88 to travel and throw the cylindrical slugs of clay to the side of the machine.

For the reciprocating travel of the carriage, a set of wheels and tracks are mounted at the bottom of the machine. As shown in Figure 1, tracks 14 are secured to base channel bars 8 of carriage 3, and tracks 15 are secured to base 6 of the machine. Base 6 is a fabricated rectangular framework and is fixed to the floor. Wheels 16 attached to axles 17 ride between the two sets of tracks.

Figure 4:
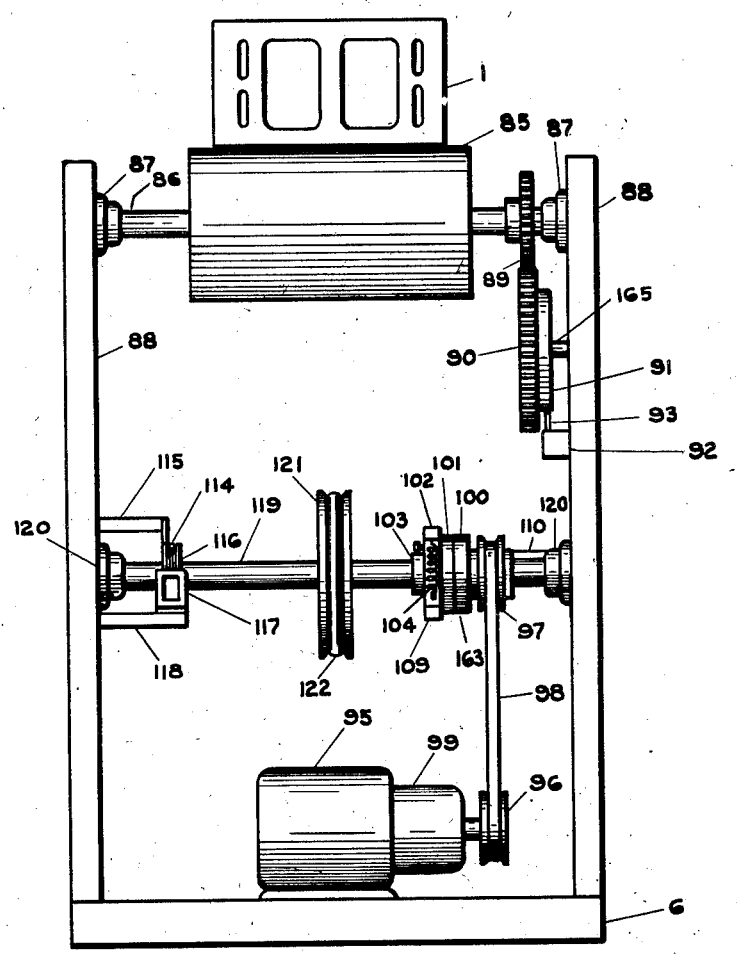
Figure 4 is a front elevation showing the timing and carriage return mechanisms.
Figure 8:
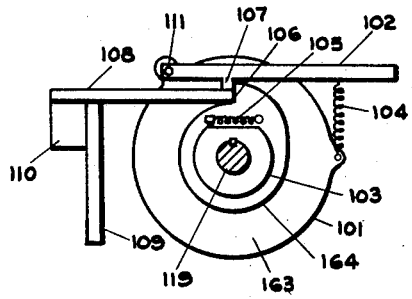
Figure 8 is a side view of the oscillating clutch of the carriage return mechanism when the carriage is at rest.
Figure 9:
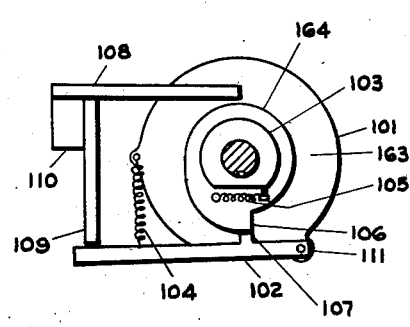
Figures 9 is a side view of the oscillating clutch when the carriage starts to return.

The mechanism for controlling the reciprocating motion of the carriage is shown in Figures 1 and 4. In Figure 1, one of the uprights 88 is omitted in order to show the mechanism more clearly. Uprights 88 are secured to the base. Motor 95 and speed reducer 99 are mounted on base 6. Pulley 96 keyed to the output shaft of the reducer is coupled by belt 98 to pulley 97 which is keyed to driving member 100 of oscillating clutch 163. Driven member 101 is keyed to shaft 119. Oscillating clutch 163 is generally the same as clutches 152 and 153 except that it carries flying lock lever 102, as shown in Figures 8 and 9. Driving member 100 rotates counter-clockwise on shaft 119. When projection 107 of lever 102 contacts step 106 of clutch cam 164, the clutch is disengaged because the cage which encloses the clutch rollers has moved the rollers out of contact between the roller cam of the driven member and the race of the driving member. While lock lever 102 is in contact, the driven member is free to rotate in a clockwise direction, Figures 8 and 9. When idling, shaft 119, to which the driven member is keyed, is locked in the position of Figure 8. Since the clutch is disengaged, the shaft is unable to rotate counterclockwise. To prevent clockwise rotation, stop lever 114 contacts step 113 of cam 112 which is keyed to shaft 119, Figures 1 and 4. Lever 114 is pivoted on bracket 115 which is secured to one of the uprights 88. The opposite end of the lever is attached to armature 116 of the solenoid 117. Solenoid 117 is mounted on bracket 118 which is attached to one of the uprights. The lever is urged against the surface of cam 112 by a spring, not shown. When solenoid 117 is energized, stop lever 114 is pulled out of contact with the step of cam 112, enabling shaft 119 to revolve counterclockwise, Figure 1. Power to rotate the shaft is supplied by the friction force of column 1 on platens 11 and 12 of carriage 3. One end of cable 122 is tied to the periphery of pulley 121 which is keyed to shaft 119. The other end of the cable is tied to the carriage by means of bracket 123 and clamp 124.

If stop lever 114 is in contact with step 113 of cam 112, carriage 3 is unable to move downstream. When the stop lever is pulled out of contact, the carriage travels downstream due to the friction force of clay column 1. The friction force is developed into torque by means of cable 122 and pulley 121, causing shaft 119 to rotate. Looking at Figures 8 and 9, driven member 101 of the clutch 163 and shaft 119 rotate clockwise, although driving member 100 is rotating counterclockwise. As the driven member revolves, projection 107 of flying lock lever 102 is maintained in contact with step 106 of clutch cam 104 by means of tension spring 104. After revolving about a half revolution, the non-pivoted end of the lock lever contacts stop 109, and projection 107 is pulled out of contact with clutch cam step 106, Figure 9. Tension spring 105 immediately pulls clutch cam 104 counterclockwise. Since the clutch cam is connected with the roller cage through a leverage, the rollers are instantly moved into driving contact between the roller cam and the race. Thus, the clutch is engaged and shaft 119 is rotated counterclockwise, Figure 8, power being supplied by motor 95. Pulley 121 draws cable 122 around it, pulling carriage 3 upstream against the friction of column 1.

The engagement continues until stop 108 contacts step 106 of clutch cam 104, releasing the clutch. At the same time, lock lever 102 is pulled into contact with step 106. Also at the same moment, stop lever 114 is pulled into contact with step 113 of cam 112. Thus, shaft 119 and in turn carriage 3 are locked in position.

Stops 108 and 109 are secured to bracket 110, which is attached to one of the uprights 88. Shaft 119 rides in bearings 120 which are mounted on the uprights.

In order to render the cutting process automatic, a timing mechanism is incorporated on the forward part of the machine, as shown in Figures 1 and 4. Drum 85 whose outside is covered with a material having a high coefficient of friction on clay is keyed to shaft 86. Shaft 86 rotates in bearings 87 which are mounted on uprights 88. Also keyed to shaft 86 is gear 89 which drives gear 90. Gear 90 is pinned to cam 91 and the two rotate on stud 155 which is secured to one of the uprights 88. The numbers of teeth in gears 89 and 90 are selected so that cam 91 makes one revolution when a length of clay column equal to the distance between the first and last cutting wires 37 has traveled downstream. Drum 85 is located so that the weight of clay column 1 rests upon it, causing it to rotate as the column travels. The rotation results in rise 94 of cam 91 depressing plunger 93 and closing the contacts of switch 92 for a moment. Switch 92 is connected to an electrical power supply and to solenoids 78 and 117. Thus the closing of switch 92 energizes the two solenoids simultaneously.

In the operation of the machine, ground clay is tempered with water to the proper consistency and is then pugged and extruded through die 2 by a set of augers as a continuous stream of clay column 1 which is still in the plastic stage. Die 2 has cores to produce the voids as shown in a cross section of the column, Figures 2 and 4.

Referring to Figure 1, motor 41 is constantly rotating. The motion is transmitted through pulleys 43, 44, and 45 and belts 46 and 47 to cylindrical cutters 32 which rotate within ball bearing units 38. Motor 68 transmits its constant rotary motion through speed reducer 70, pulleys 71 and 73, and belt 72 to driving member 74 of single revolution clutch 152. Motor 95 transmits its constant rotary motion through speed reducer 99, pulleys 96 and 97, and belt 98 to driving member 100 of oscillating clutch 163. Driving member 74 rotates on shaft 65. Driving member 100 rotates on shaft 119. Conveyor belts 88 are also constantly traveling, being driven from motor 68 through pulleys 163 and 164 and belt 165.

Before the cycle starts, carriage 3 is locked in its upstream position. Contact of lever 114 on cam step 113 prevents its movement downstream by the friction force of the column on platens 11 and 12. Disengagement of clutch 163 prevents its movement upstream. Cutter framework 4 is locked just beyond the top dead center position due to the disengagement of clutch 152 by lever 76. Ejector framework 5 is also locked just beyond its top dead center position by lever 157 disengaging clutch 153.

Column 1 traveling over drum 85 causes it to rotate and in turn cam 91 revolves. Cut 167 of the column was made by the first upstream set of cutters. When this cut reaches the last set of cutters as shown in Figure 1, rise 94 closes switch 92. Solenoids 117 and 78 are then energized. The energization of solenoid 117, pulls lever 114 out of contact with cam step 113, releasing carriage 3 from its locked position. The friction force of the column rapidly accelerates the carriage so that the carriage and column travel downstream in synchronization.

The energization of solenoid 78, pulls lever 76 out of contact with cam step 82, allowing clutch 152 to immediately engage. Shaft 65 then rotates and through cranks 66 and connecting rods 59, cutter frame 3 moves down in nearly simple harmonic motion. Cutting wires 37, small tubular cutters 31 and large tubular cutters 32 penetrate vertically through the column, passing slightly below platens 11 and 12. The cutting frame with all the cutters pass up through the column in exactly the same path as when traveling down. Large tubular cutters 32 are rotating throughout this period of cutting.

As soon as shaft 65 rotates, driving member 154 of clutch 153 rotates on shaft 64 through gears 83 and 84. When the cutters have penetrated through the bottom of the clay column, rise 162 of cam 160 which rotates with shaft 65, strikes roll 159, tripping lever 157, causing the engagement of clutch 153. See Figure 3. Immediately, shaft 64 rotates and drives ejector frame 5 through cranks 63 and connecting rods 58, as shown in Figure 1. Ejector pistons 127 and 128 (Figure 5) push the slugs of clay down through the tubular cutters 31 and 32 and through the clay column. The clay slugs drop onto the belts 38 and are conveyed to the side of the machine where another belt can pick them up and return them to the pug mill. Since the cutters are traveling up while the ejectors are traveling down, pistons 31 and 32 pass partially below the bottom of the tubular cutters. Wires 37 enter slots 139 and 140 provided in the pistons.

In the meantime, carriage 3 aided by the clamping action of the cutting tubes on the column, has been traveling downstream with the column. The speeds of shafts 64 and 65 are such that cutter frame 4 and ejector frame 5 reach their top positions at approximately the same time although the ejector frame started down later. Both frames stop just beyond their top dead centers automatically by the operation of the single revolution clutches. Since solenoid 78 was deenergized as soon as rise 94 of timing cam 1 passed beyond plungers 3 of switch 92, lever 76 is urged against the surface of clutch cam 81. When the full revolution of the shaft is completed, the lever strikes step 82 and releases the clutch. At the same time, once the rise 162 of cam 160 passed beyond roll 159, lever 157 was urged against the surface of clutch cam 156. Clutch 153 is released upon the lever striking the step of clutch cam 156.

Carriage 3 in traveling downstream rotates shaft 119 through cable 122 and pulley 121. Driven member 101 of oscillating clutch 163 rotates with the shaft. Driving member 100 continues to rotate in the opposite direction. The clutch 163 remains released due to projection 107 of lock lever 102 which is secured to the driven member maintaining contact with step 106 of clutch cam 164.

After carriage 3 has traveled a predetermined distance downstream, the end of lock lever 102 strikes trip lever 109. Clutch cam 164 is released and clutch 163 is engaged. Shaft 119 now rotates in the opposite direction, pulling carriage 3 back by drawing cable 122 onto pulley 121. The location of trip lever 109 and the speed of shaft 65 are such that even with the fastest possible speed of column 1, the cutters and ejector pistons are out of the clay, when the carriage starts returning. If the column is slow, the carriage continues to travel downstream through the predetermined distance while the cutter and ejector frames are idle at the top positions.

Carriage 3 travels upstream until trip lever 108 strikes step 106 of clutch cam 164. Cam 164 revolves slightly permitting projection 107 of lever 102 to engage step 106. The clutch is released and shaft 119 ceases rotating. At the same time that lever 102 engages step 106, the solenoid lever 114 engages step 113 of cam 112, preventing the carriage from traveling downstream.

The units cut from the clay column are pushed downstream, off the platens 12 onto a belt conveyor from which they are loaded onto drying cars.

A new cycle is initiated when rise 94 of cam 91 again closes the contacts of switch 92.

Figure 13:
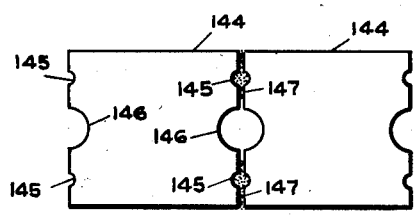
Figure 13 is a plan view of clay blocks with end recesses as they would appear in a wall construction.

Figure 11 shows a plan view of tile units 144 as cut from the column immediately after the cutters have passed through and before the slugs have been ejected. Figure 13 shows a plan view of tile units 144 as they appear in a wall construction. Mortar 147 is placed along the side walls, the recesses 145 locking it in place. Because of the lock, less mortar can be used than with tile having straight ends. Recess 146 serves to discourage a mason from using excessive mortar and also can be used for passing electrical conduits or pipes. Recesses 145 along with recess 146 present a tortuous path for any moisture that may tend to penetrate between the tile unit and the mortar. Thus, the recesses in the units cut by my machine, provide a stronger and more economical wall and lend greater resistance to moisture penetration.

Figure 14:
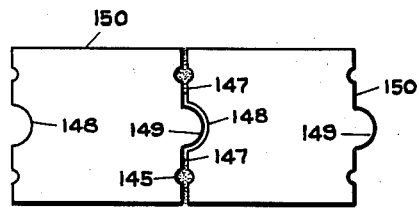
Figure 14 is a plan view of clay blocks with end recesses and interlocking tongue and groove as they would appear in a wall construction.

Figure 12 shows a plan view of tile units 150 as cut from the column immediately after the cutters of Figure 6 have passed through. Figure 14 shows a plan view of tile units 150 as they appear in a wall construction. The groove 148 and tongue 149 form an interlock. This wall presents the advantages of an economical and moisture resistant wall, the same as that of Figure 13. It does not lend itself to the concealment of piping, but it does provide a stronger wall due to the tile interlock.

Although two different contours of cut have been disclosed, an unlimited number of variations are possible. The machine can cut straight ends at high speeds. Cylindrical cutters, semi-cylindrical cutters, and even straight sheet cutters can be used in any number of variations.

It will be appreciated that for many of the mechanical devices, other means may accomplish the same results. Jaw type friction or electrical clutches may be substituted for the single revolution and oscillating roller clutches described. The intermittent motion between shafts 65 and 64 may be secured by intermittent gears among other means. The vertical motion of the cutter and ejector frames may be produced by cams, hydraulic power, or other mechanical means. The reciprocating motion of the carriage may also be obtained by cams, hydraulic power, or other mechanical means without departing from the scope of the invention in cutting machines.

Although described as applied to a clay column, the invention may also be used on any plastic column.

Figure 15:
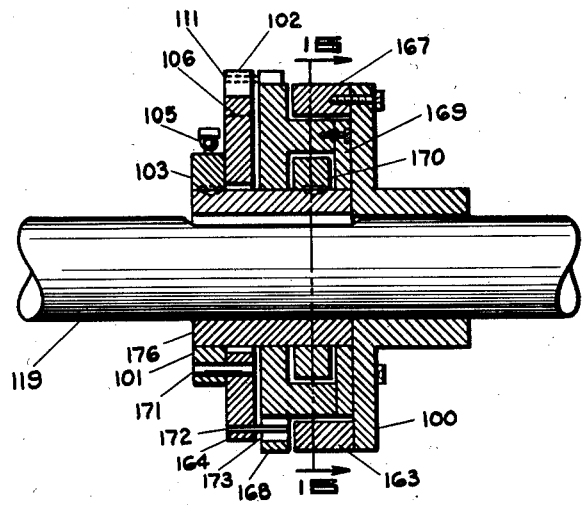
Figure 15 is a longitudinal section of the oscillating clutch mechanism.
Figure 16:
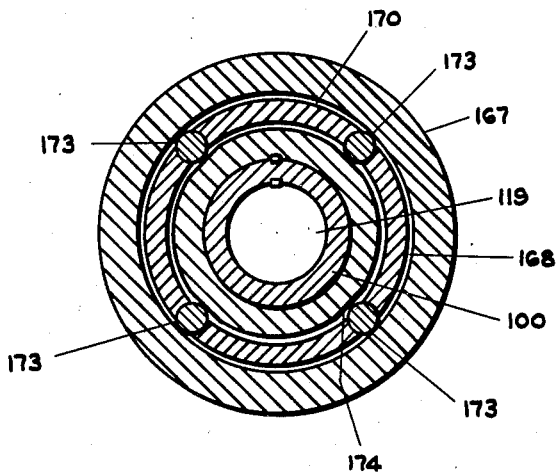
Figure 16 is a transverse section taken in the plane 16—16 of Figure 15.

Figures 15 and 16 show in detail the internal structure of an oscillating clutch. Figure 15 is a longitudinal section through the center. Figure 16 is a section through the plane 16—16 of Figure 15.

Driving member 100 rotates on shaft 119 when the clutch is disengaged. To the flanged portion of the driving member, hardened steel race 167 is attached. Driven member 101 is keyed to shaft 119. To the bushing portion 176, roller cam 170 is keyed. Between race 167 and cam 170, a plurality of rollers 173 are spaced. The rollers are held in place by roller cage 168 and enclosure 169. The roller cage has a rotating slide fit on bushing 176. The roller cage is revolved through a small arc by the action of trip cam 164 which also acts as a pivoted lever. Pivot pin 171 is secured to hub 103 which is keyed to bushing 176. Trip cam 164 is actuated at step 106 by trip lever 108, Figure 8, causing it to revolve about pin 171. Cam 164 revolves roller cage 168, by means of pin 164 which is secured to the cam diametrically opposite step 106. Pin 172 slides in slot 173 of cage 168. Lock lever 102 is pivoted at pin 111 which is secured to cage 168. Pin 111 may be secured to hub 103 for the same result.

The clutch is disengaged when trip lever 108 strikes step 106 of trip cam 164. In this position, roller cage 168 is revolved so that the rollers 173 are moved out of contact between the race 167 and flat surfaces 174 of roller cam 170. The clutch is still disengaged, even though lever 108 is not in contact with step 106, if lock lever 102 has its projection 107 in contact with step 106. Lever 102 holds cam 164 in the position which maintains rollers 173 out of driving contact. For clutch engagement, step 106 of cam 164 must be free so that spring 105 which is attached to hub 103 will pull cam 164 and in turn cage 168 is revolved to move rollers 173 into driving position between race 167 and flat surfaces 174.

Although described with respect to a roller type of clutch, the oscillating clutch principle may be applied to a jaw type or a friction clutch, mechanically or electrically operated. The flying lock lever 102 is mounted on the driven member. Disengagement is maintained until the lock lever is tripped, releasing the mechanism for engagement. The same device may be applied to an eddy current or magnetic clutch by having the lock lever hold open a switch, mounted on the driven member, during disengagement. Upon tripping the lock lever, the circuit is closed and the clutch is energized for engagement.

It is obvious that many changes of detail can be arranged without departing from the principles of the invention.

What I claim is:

1. In a device for simultaneously piercing and cutting an extruded plastic column, the combination of a track base, a primary frame operably mounted for movement on said track base, a first power source connected to effect reciprocatory movement of said frame, a control mechanism operably disposed and actuated by movement of said plastic column to correlate said frame movement with the movement of said column, a table attached to said primary frame and disposed to receive said column, a secondary frame mounted on said primary frame, a plurality of cutting wires mounted on said secondary frame, a plurality of other cutting means mounted on said secondary frame, and a second power means connected to actuate said secondary frame intermittently and allow said cutting wires and other cutting means to operate on said plastic column.

2. In a device for simultaneously piercing and cutting an extended plastic column, the combination of a track, a primary framework including a plastic column receiving platen operably mounted on said track, a first power source connected to effect reciprocatory movement of said framework, a timing mechanism actuated upon engagement with said movable column to control said primary framework movement in relation to said column movement, a secondary framework operably carried on said primary framework, a plurality of cutting wires mounted on said secondary framework, a plurality of piercing cutters operably mounted on said secondary framework, a second power source operably connected to effect intermittent secondary framework movement, and a third power source operably disposed to rotate said other cutter means whereby said secondary framework movement serves to operate said cutting wires and other rotatable cutting means simultaneously while engaging said column and effect a piercing and cutting operation thereon.

3. In a device for simultaneously piercing and cutting an extruded plastic column, the combination of a track, a primary framework including a plastic column receiving platen operably mounted on said track, a first power source connected to effect reciprocatory movement of said frame, a timing mechanism actuated upon engagement with said movable column to control said primary framework movement in relation to said column movement, a secondary framework operably mounted on said primary framework, a plurality of cutting wires mounted on said secondary framework, a plurality of piercing cutters operably disposed in alignment with said cutting wires for operation in the same plane therewith and mounted on said secondary framework, a second power source connected to effect intermittent secondary framework movement together with simultaneous movement of said cutting wires and said piercing cutters, and control means disposed to control said second power source whereby said cutters operate to engage and cut said plastic column at a predetermined position of said primary framework on said tracks.

JOSEPH J. GANO.

References Cited in the file of this patent

UNITED STATES PATENTS

| Number | Name | Date |
|---|---|---|
| 691,059 | Jones | Jan. 14, 1902 |
| 812,702 | Stuart | Feb. 13, 1906 |
| 1,108,845 | Jensen | Aug. 25, 1914 |
| 1,132,851 | Jensen | Mar. 23, 1915 |
| 1,340,824 | Crozier | May 18, 1920 |
| 1,692,160 | Domer | Nov. 20, 1928 |
| 1,737,847 | Hottinger | Dec. 3, 1929 |
| 1,728,373 | Shipley | Sept. 17, 1929 |
| 1,749,375 | Dahl | Mar. 4, 1930 |
| 1,789,558 | Makowski | Jan. 20, 1931 |
| 1,811,412 | Whitacre | June 23, 1931 |
| 1,880,872 | Denton | Oct. 4, 1932 |
| 1,973,092 | Mooney | Sept. 11, 1934 |
| 2,029,625 | Lee et al. | Feb. 4, 1936 |
| 2,075,038 | Hutchinson | Mar. 30, 1937 |
| 2,107,068 | Dauwalter | Feb. 1, 1938 |
| 2,200,730 | Smallwood et al. | May 14, 1940 |
| 2,263,474 | Scheibl | Nov. 18, 1941 |
| 2,272,895 | Stevens | Feb. 10, 1942 |

FOREIGN PATENTS

| Number | Country | Date |
|---|---|---|
| 534,670 | Great Britain | Mar. 13, 1941 |